United States Patent [19]
Kirillov et al.

[11] 3,746,232
[45] July 17, 1973

[54] DEVICE FOR FEEDING WELDING WIRE OR ELECTRODES

[76] Inventors: Vladimir Ivanovich Kirillov, ulitsa Krasnopresnenskaya 25; Alexei Vasilievich Batyrev, prospekt imeni Lenina 179, kv. 134, both of Volgograd, U.S.S.R.

[22] Filed: July 8, 1971

[21] Appl. No.: 160,817

[52] U.S. Cl. ............................. 226/187, 226/188
[51] Int. Cl. ............................................ B65h 17/20
[58] Field of Search ...................... 214/338, 339; 226/188, 108, 181, 187; 74/25

[56] References Cited
UNITED STATES PATENTS
3,387,759   6/1968   Stedman ........................ 226/108
3,424,012   1/1969   Hirmann ........................... 74/25

*Primary Examiner*—Richard A. Schacher
*Attorney*—John G. Schwartz et al.

[57] ABSTRACT

A device for feeding welding wire or wire electrodes into a welding zone comprising a rotatable cage mounted in a housing, the cage supporting rollers inclined at an angle to the axis of rotation of the cage so that the rollers feed the wire longitudinally along the axis of rotation. Disposed in the housing at its opposite ends but outside the case are a pair of spring-loaded rolls which are loosely rotatable about shafts extending at right angles to the feed direction of the wire, the spring-loaded rolls being provided with peripheral grooves in which the wire is received so that the wire is fed without rotation.

3 Claims, 4 Drawing Figures

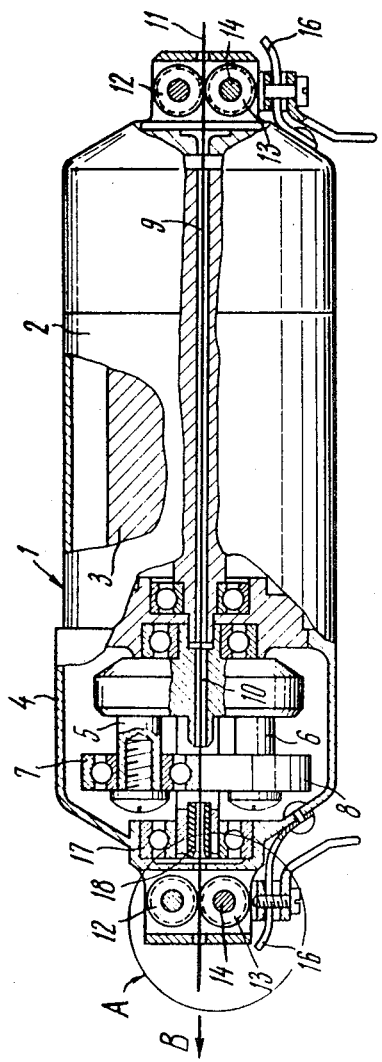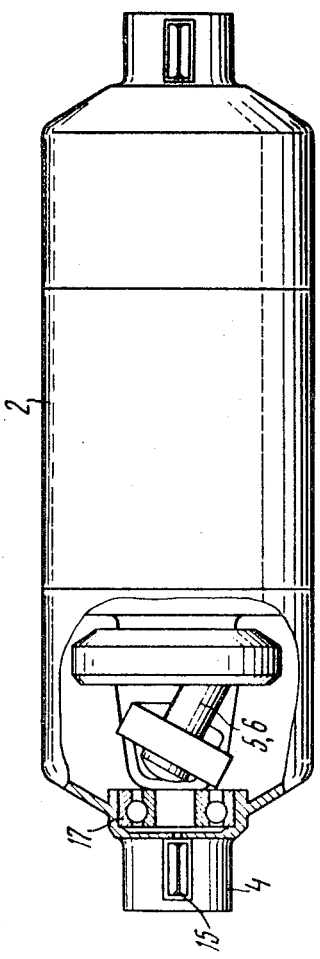

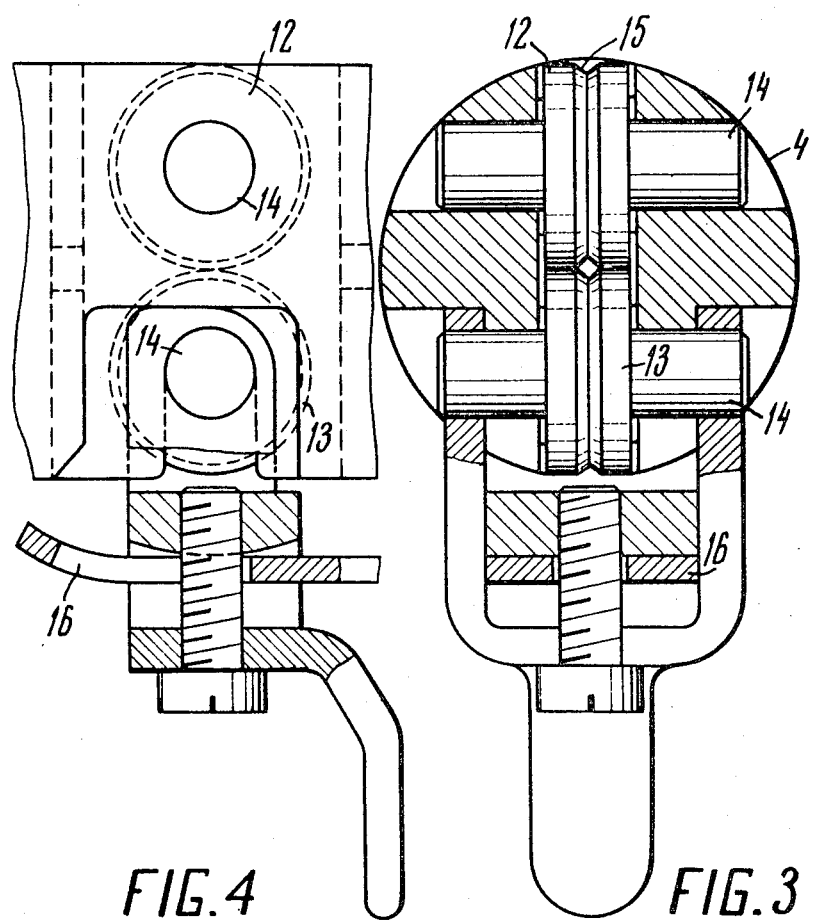

DEVICE FOR FEEDING WELDING WIRE OR ELECTRODES

The present invention relates to welding equipment and particularly to a devices for feeding of welding wire or electrodes.

Most efficiently, the present invention can be utilized in machines for automatic or semi-automatic welding of metals or/and alloys, it is, however, equally applicable to wire production plants, as well as to other devices, where circular cross-section stock is to be fed at a constant rate without being rotated.

Known in the prior art is a device for feeding welding wire without rotation incorporating a pair of drive rolls, one of which is knurled. The wire is propelled between the revolving rolls by the frictional force.

The drawback of the known device is that the knurled rolls tend to distort the surface of the wire being fed, by producing deep notches therein. The use of such device may then be limited to feeding is liable to restrict the use of that device for feeding powered electrodes and welding wire of soft non-ferrous metals such as, aluminum, especially of small diameters.

This drawback is, to a certain extent, offset in another known device, comprising a pair of rolls free to rotate and mounted in a power-driven cage on concurrent pins. The rolls perform a planetary spinning motion around the wire with the component of the frictional force propelling the electrode wire, uncoiled from the reel, in the feed direction (see Bulgarian Author's Certificate N 10986, Cl.21h, 30/7).

However, the revolving drive rolls incorporated in the above device, are prone to twist the wire section between the rolls and the reel. Under the action of elastic deformation of the wire metal, this section untwists systematically, yet, it causes the wire to revolve about its axis in the feed rolls. Next the foregoing process is repeated. This results in the intermittent, non uniform feeding of the welding wire into the welding zone which tends to have a deleterious effect on the welding process, as it not only decreases the arc stability but is liable to impair penetration and weld forming conditions.

It is an object of the present invention to eliminate the above drawbacks.

The present invention is in essence aimed at developing a wire feeding device ensuring a uniform supply of the wire into the welding zone without distorting the wire surface as well as providing a universal mechanism suitable for usage without readjustment for feeding steel, aluminum, copper and tube wires as well as covered electrodes in semi-automatic and automatic welding machines.

The specified object is achieved in a device for feeding welding wire or electrodes, which comprises a power-driven cage rotating in a housing and enclosing freely rotatable rolls for feeding wire or electrodes, the rolls being mounted on parallel pins according to the invention, the provision of additional members constituted as spring-loaded rolls free to rotate on their support shafts and provided with circumferential grooves accommodating the wire being propelled, said roll support shafts being arranged in the housing outside the revolving cage and at right angles to the direction of feed of the wire or electrode.

With the arrangement according to the invention both wire and electrodes can be uniformly fed into the welding zone at a constant rate, which tends to improve appreciably arc stability, penetration and weld forming conditions.

Given below is an exemplary embodiment of the present invention to be considered with due reference to the accompanying drawings, wherein:

FIG. 1 is a side view of the device, according to the invention;

FIG. 2 is a fragmentary cut-away top view thereof;

FIG. 3 is an enlarged view of assembly A of FIG. 1; and

FIG. 4 is a side view of the assembly in FIG. 3.

The device consists of housing 1 (FIG. 1) incorporating electric motor 2 to the rotor 3 of which is attached a cage 4 which encloses pins 5 and 6 and spring-loaded rolls 7 and 8 mounted on the pins.

Rotor 3 of electric motor 2 and cage 4 have central bores 9 and 10 through which passes an uncoiled welding wire 11 from a reel (not shown in the drawing).

Arranged in housing 1 outside care 4 are spring-loaded rolls 12 and 13 whose shafts 14 are at right angles to the direction in which wire 11 is fed.

Rolls 12 and 13 (FIGS. 2 and 3) are provided with circumferential grooves 15 to facilitate passage of the wire and a spring 16 acts to bias the rolls to urge them tightly against the wire surface to generate the requisite frictional force to prevent the wire from spinning about its axis.

Pins 5 and 6 of rolls 7 and 8 are parallel, as shown in FIG. 2 and are inclined at an angle with respect to the direction of travel B of wire 11.

Mounted in bearings 17 in the space between cage 4 and rolls 12 and 13 is a guide sleeve 18 designed to hold wire 11.

The device operates as follows:

Prior to actuation of electric motor 2, wire 11 is propelled manually through bores 9 and 10 so that it enters the bites of roll pairs 12 – 13 and 7 – 8.

As soon as electric motor 2 is actuated, cage 4 together with the spring-loaded rolls 7 and 8 therein starts rotating.

With wire 11 passing between rotating rolls 7 and 8 a force originates pulling the wire in the feed direction (shown by arrow B).

The rotation of rolls 7 and 8 also gives rise to a force which causes the wire to revolve as well.

Rolls 11 and 12 rotate on shafts 13 with the surfaces of the grooves 15 tightly forced against the surface of the wire 10. Thereby a frictional force is developed whose moment is larger than the torque generated by revolving rolls 7 and 8.

As a result wire 11 is fed without being rotated, uniformly and at a constant rate.

What is claimed is:

1. A device for feeding welding wire or wire electrodes into a welding zone, said device comprising: a housing; a power-driven cage rotatably enclosed in said housing; means for imparting a rotary motion to said cage; pins mounted inside said cage at an angle to the axis of rotation of the cage; rolls loosely mounted on said pins for rotation thereon for feeding the wire into the welding zone in an axial feed direction; shafts mounted in said housing and outside the revolving cage at right angles to the feed direction of the wire; and spring-loaded rolls loosely mounted on said shafts for rotation thereon, said rolls being provided with circumferential grooves in which the wire being propelled is received so as to feed the wire without rotation.

2. A device as claimed in claim 1 wherein said housing has opposite ends and said shafts and spring-loaded rolls are mounted in pairs at the opposite ends of the housing.

3. A device as claimed in claim 1 wherein said pins are parallel to one another.

* * * * *